US008749906B2

(12) United States Patent
Aravind

(10) Patent No.: US 8,749,906 B2
(45) Date of Patent: *Jun. 10, 2014

(54) SYSTEMS AND METHODS FOR IMPROVED SERVO DATA OPERATION

(71) Applicant: Agere Systems Inc, Allentown, PA (US)

(72) Inventor: Nayak Ratnakar Aravind, Allentown, PA (US)

(73) Assignee: Agere Systems Inc, Allentown, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/893,742

(22) Filed: May 14, 2013

(65) Prior Publication Data

US 2013/0250745 A1    Sep. 26, 2013

Related U.S. Application Data

(63) Continuation of application No. 12/992,940, filed as application No. PCT/US2008/078047 on Sep. 29, 2008, now Pat. No. 8,462,455.

(51) Int. Cl.
*G11B 27/36* (2006.01)
*G11B 5/596* (2006.01)

(52) U.S. Cl.
USPC ............................................. 360/31; 360/75

(58) Field of Classification Search
None
See application file for complete search history.

(56) References Cited

U.S. PATENT DOCUMENTS

| 6,798,594 | B2 * | 9/2004 | Belser ............................ 360/53 |
| 6,876,511 | B2 | 4/2005 | Koyanagi |
| 7,082,005 | B2 | 7/2006 | Annampedu |
| 7,362,536 | B1 | 4/2008 | Liu |
| 2008/0080082 | A1 | 4/2008 | Erden et al. |

FOREIGN PATENT DOCUMENTS

| JP | 2005-078786 | 3/2005 |
| JP | 2007-149219 | 6/2007 |
| JP | 2008-171488 | 7/2008 |

* cited by examiner

*Primary Examiner* — Regina N Holder
(74) *Attorney, Agent, or Firm* — Hamilton DeSanctis & Cha

(57) ABSTRACT

Various embodiments of the present invention provide systems, methods and media formats for efficiently determining a position error of a head in relation to a storage medium. In one case, a system is disclosed that includes a storage medium with a series of data. The series of data includes a first defined marker and a second defined marker located a distance from the first defined marker, and position location data. The systems further include a first detector circuit that is operable to detect the first defined marker and to establish a location of the first defined marker, and a second detector circuit that is operable to detect the second defined marker and to establish a location of the second defined marker. The systems further include an error calculation circuit and an interpolation circuit. The error calculation circuit is operable to calculate an interpolation offset based at least in part on the location of the first defined marker and the location of the second defined marker. The interpolation circuit is operable to interpolate the position location data and to provide an interpolated position location data.

20 Claims, 5 Drawing Sheets

SYSTEMS AND METHODS FOR IMPROVED SERVO DATA OPERATION

CROSS REFERENCE TO RELATED APPLICATION

The present application claims priority to (is a continuation of) U.S. patent application Ser. No. 12/992,940 entitled "Systems and Methods for Improved Servo Data Operation" and filed on Nov. 16, 2010 by Ratnakar Aravind; which claims priority to PCT Patent Application No. PCT/US08/78047 entitled "Systems and Methods for Improved Servo Data Operation" and filed on Sep. 29, 2008 by Ratnakar Aravind. The entirety of each of the aforementioned reference is incorporated herein by reference for all purposes.

BACKGROUND OF THE INVENTION

The present invention is related to storage media, and more particularly to systems and methods for aligning a read/write head assembly in relation to a storage medium.

A typical storage medium includes a number of storage locations where data may be stored. Data is written to the medium within areas designated for user data by positioning a read/write head assembly over the storage medium at a selected location, and subsequently passing a modulated electric current through the head assembly such that a corresponding magnetic flux pattern is induced in the storage medium. To retrieve the stored data, the head assembly is positioned over a track containing the desired information and advanced until it is over the desired data. The previously stored magnetic flux pattern operates to induce a current in the head assembly, and the induced current may then be converted to an electrical signal representing the originally recorded data.

The storage locations on the storage medium are typically arranged as a serial pattern along concentric circles known as tracks. FIG. 1 shows a storage medium 100 with two exemplary tracks 150, 155 indicated as dashed lines. The tracks are segregated by servo data written within wedges 160, 165. The servo data includes data and supporting bit patterns that are used for control and synchronization of the read/write head assembly over a desired storage location on storage medium 100. In particular, the servo data traditionally includes a preamble pattern followed by a single sector address mark (SAM). The SAM is followed by a Gray code, and the Gray code is followed by burst information. It should be noted that while two tracks and two wedges are shown, hundreds of each would typically be included on a given storage medium. Further, it should be noted that a sector may have two or more burst fields depending upon the approach selected for determining position error.

Conventional servo data utilizes the preamble field to adjust timing and gain loops in an effort to synchronize sampling to data written to the storage medium. After the timing loops and gain loops are stable, the SAM, the Gray code and the burst information are processed to determine location on the storage medium and to generate a position error signal. Accurate determination of the timing and gain from the preamble is critical to proper processing of the servo data. For example, where the timing is not accurate, any position error signal will be correspondingly inaccurate. This inaccuracy can cause an increase in bit error rate due to improper positioning of the read/write head assembly in relation to the storage medium. To increase the accuracy of the timing and gain loops, longer preambles may be chosen. However, increasing the preamble length causes a corresponding reduction in storage density on the storage medium.

Hence, for at least the aforementioned reasons, there exists a need in the art for advanced systems and methods for increasing the accuracy of position error determination.

BRIEF SUMMARY OF THE INVENTION

The present invention is related to storage media, and more particularly to systems and methods for aligning a read/write head assembly in relation to a storage medium.

Various embodiments of the present invention provide systems for efficiently determining a position error of a head in relation to a storage medium. Such systems include a storage medium with a series of data. The series of data includes a first defined marker and a second defined marker located a distance from the first defined marker, and position location data. The systems further include a first detector circuit that is operable to detect the first defined marker and to establish a location of the first defined marker, and a second detector circuit that is operable to detect the second defined marker and to establish a location of the second defined marker. The systems further include an error calculation circuit and an interpolation circuit. The error calculation circuit is operable to calculate an interpolation offset based at least in part on the location of the first defined marker and the location of the second defined marker. The interpolation circuit is operable to interpolate the position location data and to provide an interpolated position location data. In some cases, the systems further include a burst demodulation circuit that generates a position error signal based at least in part on the interpolated position location data. In one or more instances of the aforementioned embodiments, the first detector circuit and the second detector circuit are identical. In other instances of the aforementioned embodiments, the first detector circuit and the second detector circuit have a substantial amount of common circuitry. For example, in one case, the location determination circuitry is common between the two detectors, but each detector has a different register holding a respective expected SAM pattern.

In some instances of the aforementioned embodiments, the series of data is sector data including a preamble pattern. The first defined marker is a first sector address mark and the second defined marker is a second sector address mark. In such instances, the systems further include a signal receiving circuit having an analog to digital converter that samples an analog input using a sampling clock operating at a frequency and a phase to create the series of samples, and a preamble detector and clock recovery circuit. The preamble detector and clock recovery circuit is operable to detect the preamble pattern within the sector data and to adjust at least one of the frequency and the phase based on the preamble pattern to create an adjusted sampling clock. The interpolation offset may be operable to at least in part compensate for a phase error in the adjusted sampling clock. In some cases, the location of the first defined marker includes a combination of fractional distance and an integer distance from a reference location.

In various instances of the aforementioned embodiment, the position location data includes at least a first burst pattern and a second burst pattern. In such cases, the first sector address mark is located after the preamble pattern and before the first burst pattern, and the second sector address mark is located after the first burst pattern and before the second burst pattern. In some cases, the sector data further includes a Gray code that is located after the first sector address mark and before the second sector address mark.

Other embodiments of the present invention provide methods for efficient determination of a position error. Such methods include providing a storage medium having a series of data. The series of data includes a first defined marker and a second defined marker located a distance from the first defined marker, and position location data. The series of data is received, and the first defined marker and second defined marker are detected. The location of both the first defined marker and the second defined marker are identified, and an interpolation offset is calculated based at least in part on the first location and the second location. The position location data is interpolated using the interpolation offset to create interpolated position location data and a position error is determined using the interpolated position location data.

In some instances of the aforementioned embodiments, the series of data is sector data including a preamble pattern. The first defined marker is a first sector address mark and the second defined marker is a second sector address mark. In such instances, receiving the series of data includes receiving an analog input including the sector data, and sampling the analog input using a sampling clock operating at a frequency and a phase to generate at least a portion of the sector data. The preamble pattern is detected within the sector data. Based on the preamble pattern, one or both of the frequency and the phase are adjusted to yield an adjusted sampling clock. The analog input is then sampled using the adjusted sampling clock. In some cases, the interpolation offset is operable to at least in part compensate for a phase error in the adjusted sampling clock.

In some instances of the aforementioned embodiments, the first sector address mark is the same as the second sector address mark. In other instances, the first sector address mark is distinct from the second sector address mark. In various instances of the aforementioned embodiments, the position location data includes at least a first burst pattern and a second burst pattern. In such instances, the first sector address mark is located after the preamble pattern and before the first burst pattern, and the second sector address mark is located after the first burst pattern and before the second burst pattern. In some cases, the sector data includes a Gray code that is located after the first sector address mark and before the second sector address mark. In various instances of the aforementioned embodiments, the position location data includes at least a first burst pattern, a second burst pattern and a third burst pattern. In such instances, the first sector address mark is located after the preamble pattern and before the first burst pattern, and the second sector address mark is located after the second burst pattern and before the third burst pattern.

In some cases, the storage medium further includes another sector data that has the same preamble pattern, first sector address mark and second sector address mark. In one or more instances of the aforementioned embodiments, identifying the first location of the first sector address mark includes performing a first fractional location calculation, and identifying the second location of the second sector address mark includes performing a second fractional location calculation. In some instances of the aforementioned embodiments, calculating the interpolation offset includes subtracting the first location from the second location and dividing the result by the distance.

Yet other embodiments of the present invention provide storage media that include a first sector data set having a preamble pattern, a first sector address mark, a second sector address mark, a first burst pattern, and a second burst pattern; and a second sector data set having the preamble pattern, the first sector address mark, the second sector address mark, the first burst pattern, and the second burst pattern. The first burst pattern is located before the second burst pattern, the first sector address mark is located after the preamble pattern, and the second sector address mark is located after the first burst pattern.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several drawings to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

FIG. 4 is a timing diagram illustrating the process for determining SAM location that may be used in accordance with different embodiments of the present invention;

DETAILED DESCRIPTION OF THE INVENTION

The present invention is related to storage media, and more particularly to systems and methods for aligning a read/write head assembly in relation to a storage medium.

Figure 1:
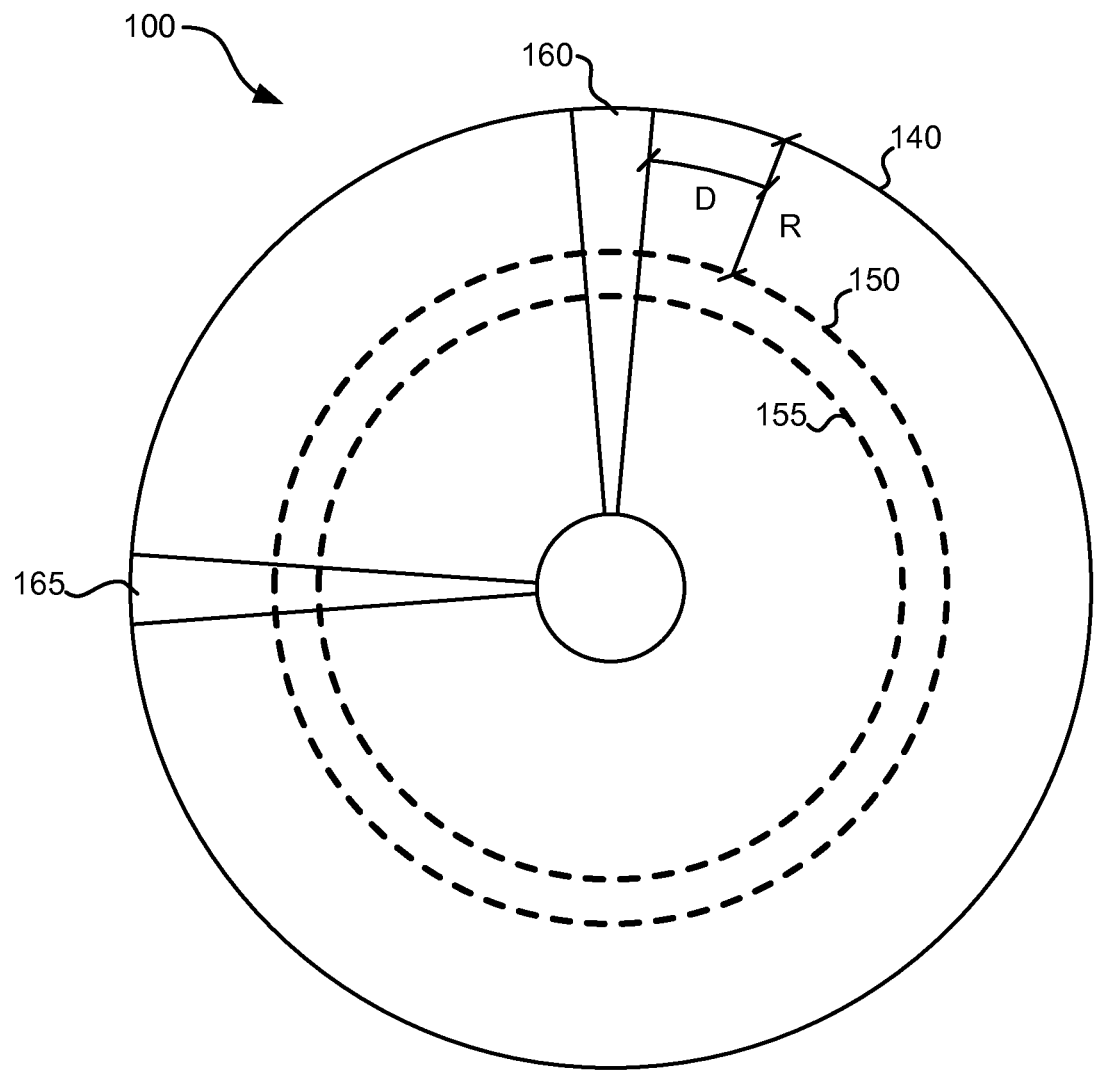
FIG. 1 depicts an exemplary, existing storage medium including user data areas and intervening servo data wedges.
Figure 2:
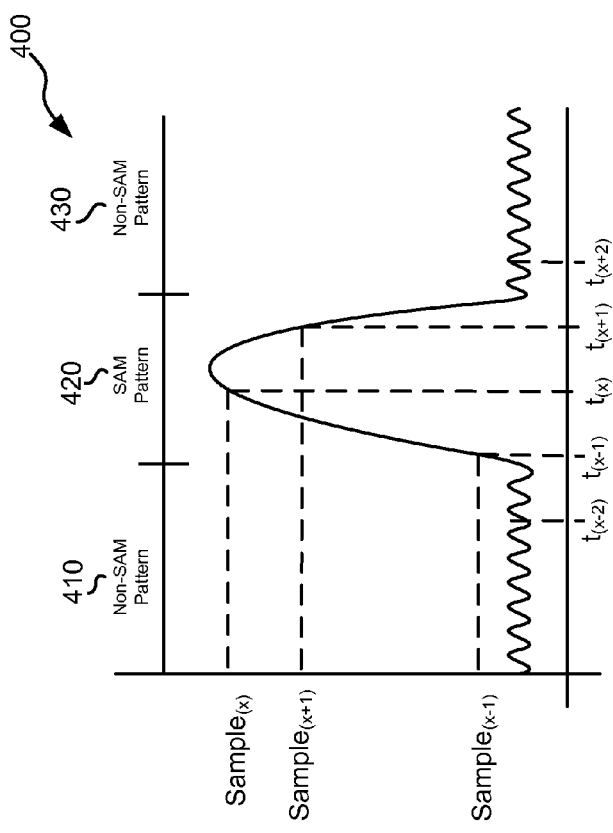
FIG. 2 depicts an enhanced servo data pattern in accordance with various embodiments of the present invention.

Turning to FIG. 2 an enhanced servo data pattern 200 is shown in accordance with various embodiments of the present invention. Enhanced servo data pattern 200 includes a preamble 204, a first servo address mark (SAM1) 206, a Gray code 208, a first burst information (Burst1) 210, a second servo address mark (SAM2) 212, and a second burst information (Burst2) 214. Enhanced servo data pattern 200 is sandwiched between two user data areas 202, 216. Gray code 208 is encoded information about track location and may be any Gray code known in the art, and Burst1 210 and Burst2 214 may be any burst information known in the art. It should be noted that more than two fields of burst information may be used depending upon the particular burst demodulation scheme implemented. For example, in some embodiments of the present invention four fields of burst information may be used. SAM1 206 is used to distinguish servo sectors from user data regions of the storage medium. SAM2 212 is used in conjunction with SAM1 206 to provide a correction to any phase error remaining after the processing of preamble 204. SAM1 206 and SAM2 212 may each include any SAM pattern known in the art. In some cases, SAM2 212 has the same pattern as SAM1 206, while in other cases, the pattern of SAM2 212 is distinct from pattern of SAM1 206.

SAM1 206 and SAM2 212 are dispersed across enhanced servo data pattern 200 and are used to provide an input for interpolating Burst1 210 and Burst2 214. In some cases, SAM1 206 and SAM2 212 are placed as far apart as possible without incurring any additional latency on a position error signal derived from processing Burst1 210 and Burst2 214. Thus, for example where enhanced servo data pattern 200 is extended to include four burst fields, SAM1 206 may be placed somewhere in the pattern before the first burst field and SAM2 may be placed in the pattern before the last burst field. Similar to existing preamble patterns, preamble 204 is a periodic pattern that is used by a data processing system to adjust timing and gain loops. However, due to the phase error correction ability created by including SAM1 206 and SAM2 212 in enhanced servo data pattern 200, preamble 204 can be shorter than a corresponding preamble in a traditional servo data pattern. It should be noted that in some cases spacers of defined bit periods are placed between one or more of Gray code 208 and Burst1 210, Burst1 210 and SAM2 212, SAM2 212 and Burst2 214, and Burst2 214 and user data 216.

In some cases, the reduction in the length of preamble 204 compared with a traditional preamble is greater than the number of bit periods required by SAM2 212. In such cases, enhanced servo data pattern 200 offers either an increase in the accuracy of the position error generated by processing of burst information without increasing the number of bit periods associated with the servo data sector, or providing the same level of accuracy of the position error generated by processing the burst information while decreasing the number of bit periods associated with the servo data sector. Based upon the disclosure provided herein, one of ordinary skill in the art will recognize a variety of other advantages that may be achieved through implementations of one or more embodiments of the present invention.

In use, a data processing system receives a series of samples corresponding to preamble 204. The samples are used to extract timing information and gain information that are used to adjust the phase and/or frequency of the sampling interval used to process later portions of enhanced servo data pattern 200. As mentioned above, preamble 204 may be relatively short resulting in some error in the sampling interval. A subsequent series of samples includes SAM1 206 which is processed and a location of the SAM1 206 is stored. Gray code 208 is then processed using conventional means to obtain track information. This is followed by reception and buffering of samples associated with Burst/210. A subsequent series of samples includes SAM2 214 which is processed and a location of the SAM2 214 is stored. The location of SAM1 206 and SAM2 214 are mathematically combined and a resulting interpolation offset is used to interpolate samples corresponding to Burst/210 that have been stored to a buffer and to process samples corresponding to Burst2 214. The interpolated burst samples may then be used in a conventional burst demodulation scheme to generate a position error signal. This position error signal may be used to adjust the location of a read/write head assembly in relation to a storage medium. The interpolation process yields a more accurate representation of Burst/210 and Burst2 214 which in turn results in a position error signal exhibiting a higher degree of accuracy. This accuracy allows for better positioning of the read/write head assembly and a corresponding increase in signal to noise ratio and decrease in bit error rate.

Figure 3:
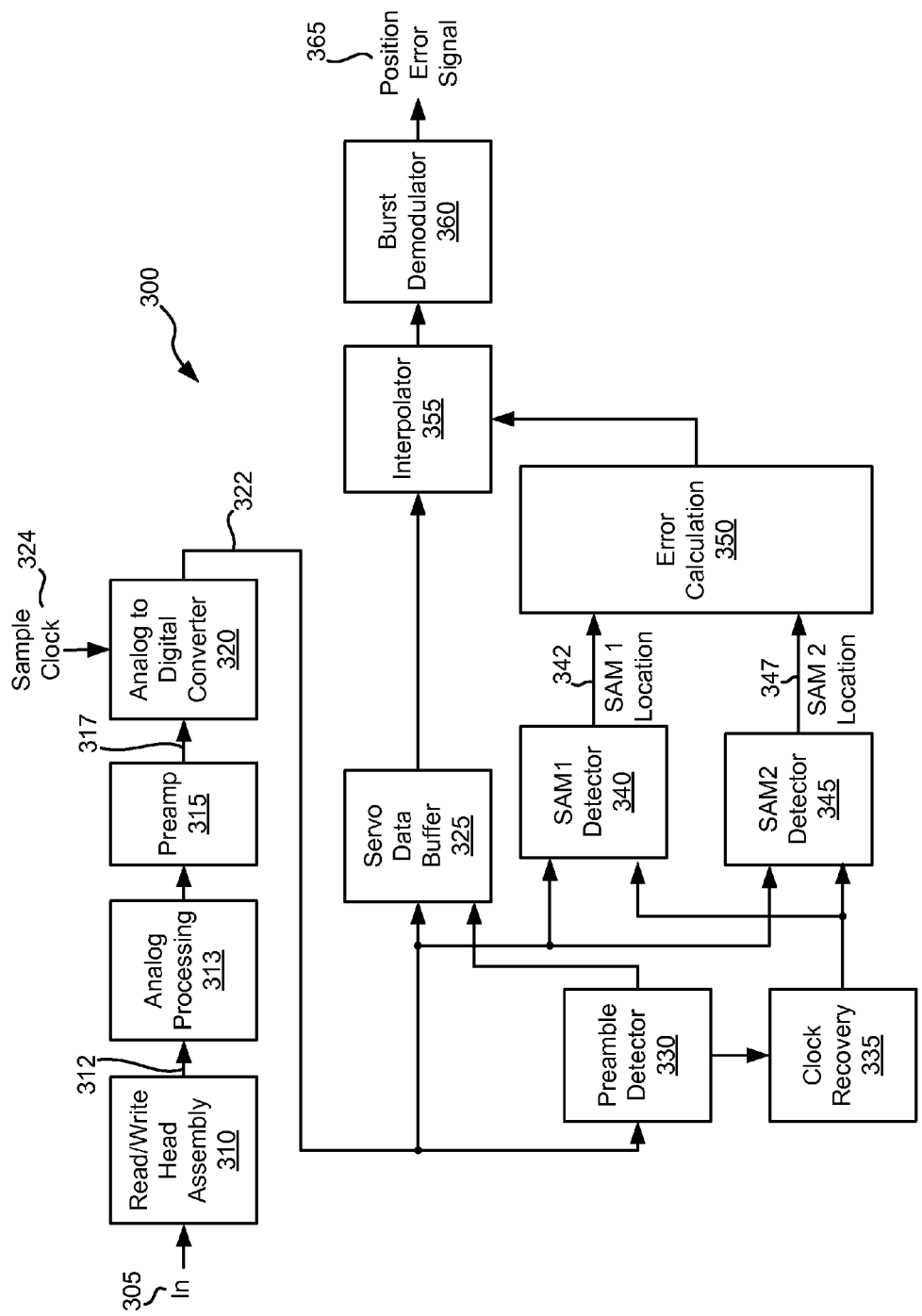
FIG. 3 is a block diagram of a system for processing enhanced servo data patterns in accordance with some embodiments of the present invention.

Turning to FIG. 3, a block diagram of a data processing system 300 tailored for processing enhanced servo data patterns is shown in accordance with some embodiments of the present invention. Data processing system 300 includes a read/write head assembly 310 that senses a magnetic field 305 stored on a storage medium (not shown) and converts the sensed information to an electrical signal 312. Electrical signal 312 is provided to an analog processing block 313 as is known in the art, and the output of analog processing block 313 is provided to a preamplifier 315 that amplifies the signal and provides a corresponding amplified signal 317. An analog to digital converter 320 receives amplified signal 317 and converts it to a series of digital samples 322 each corresponding to a time instant governed by a sample clock 324. Digital samples 322 are provided to a preamble detector 330 that operates to detect a pre-defined periodic preamble pattern (e.g., preamble 204). Once detected, the defined periodic preamble pattern is used by a clock recovery circuit 335 to adjust the phase/frequency of sample clock 324 using recovery processes that are known in the art.

Once the preamble is found, a servo data buffer 325 begins storing the series of digital samples 322 received from analog to digital converter 320. Further, digital samples 322 are provided to a SAM detection circuit 340 designed to detect a first SAM pattern (e.g., SAM1 206), and to a SAM detection circuit 345 designed to detect a second SAM pattern (e.g., SAM2 212). In some cases, SAM2 212 has the same pattern as SAM1 206. In such cases, SAM detection circuit 340 may be identical to SAM detection circuit 345. In other cases, the pattern of SAM2 212 is distinct from pattern of SAM1 206. In such cases, SAM detection circuit 340 may be similar to SAM detection circuit 345, but the two circuits are sufficiently different to allow for detection of the distinct patterns corresponding to SAM1 206 and SAM2 212. In particular embodiments of the present invention, SAM detection circuit 340 and SAM detection circuit 345 are implemented as a single circuit capable of indicating identifying both SAM1 206 and SAM2 212. In such cases where SAM1 is different from SAM2, a selectable comparison register may be included in the common SAM detection circuit to allow for detection of SAM1 206 during one interval and for detection of SAM2 212 during a subsequent interval.

Once the first SAM pattern is detected (e.g., SAM1 206), a SAM1 location signal 342 is provided to an error calculation circuit 350 that indicates a time corresponding to the detection of the first SAM pattern. Subsequently, a second SAM pattern is detected (e.g., SAM2 212), and a SAM2 location signal 347 is provided to error calculation circuit 350. Similarly, SAM 2 location signal 347 indicates a time corresponding to the detection of the second SAM pattern. In some cases, SAM detection circuit 340 and SAM detection circuit 345 each provide a respective SAM location signal that is an integer number of time periods from a reference point. In other cases, accuracy is increased where SAM detection circuit 340 and SAM detection circuit 345 each provide the aforementioned integer number of time periods from the reference point augmented by a fractional offset. The operation of one exemplary circuit for determining integer SAM locations and fractional SAM locations is discussed in relation to FIG. 4 below. Based upon the disclosure provided herein, one of ordinary skill in the art will recognize a variety of other approaches that may be used to determine SAM1 location 342 and SAM2 location 347 in accordance with different embodiments of the present invention.

FIG. 4 is a timing diagram 400 that illustrates the process for determining SAM location that may be used in relation to different embodiments of the present invention. In particular, in a period 410 before the pattern corresponding to a SAM is received, the signal level provided by a SAM detector included in SAM detection circuit 345 is relatively low. Once the SAM is detected during a SAM pattern period 420 the signal level provided by the SAM detector increases. During SAM pattern period 420, the signal from the SAM detector is sampled one or more times (e.g., at times t(x−1), t(x) and t(x+1)). The integer location of the SAM is defined to be the location (i.e., time periods from a reference point) where the signal from the SAM detector exhibits its highest value. Where only a less accurate integer value is used, the SAM location is simply the time of corresponding to the highest sample value of the signal from the SAM detector (e.g., t(x)).

In some cases, a more refined fractional SAM location value may be determined. Such an approach may involve calculating the location of the maximum value of the signal from the SAM detector based on the highest sample value and the two sample values on either side of the highest sample value (e.g., sample(x) corresponding to t(x), sample(x−1) corresponding to t(x−1), and sample(x+1) corresponding to t(x+1)) in accordance with the following equation:

$$\phi = \frac{\text{sample}(x-1) + \text{sample}(x+1)}{2 * \text{sample}(x)}.$$

The SAM location is then calculated by adding the fractional SAM location value to the location corresponding to the highest sample value (e.g., t(x)) to yield the actual SAM location according to the following equation:

$$\text{SAM location} = t(x) + \phi.$$

SAM1 location 342 and SAM2 location 347 are combined by an error calculation circuit 350 to generate an interpolation offset 352. In particular, the difference between SAM1 location 347 and SAM2 location 342 is calculated and divided by a known distance between SAM1 location 342 and SAM2 location 347 (i.e., the known distance between SAM1 206 and SAM 2 212) as set forth in the following equation:

$$\text{Interpolation Offset} = \frac{\text{SAM 2 Location 347} - \text{SAM 1 Location 342}}{\text{Known Distance}}.$$

The known distance is defined at the time servo data is written to the storage medium, and is the expected number of bit periods between SAM1 206 and SAM2 212. In some cases, the known distance is increased as much as possible (resulting in a corresponding increase in the difference between SAM2 location 347 and SAM1 location 342) to increase the accuracy of the above mentioned equation. Increasing the known distance is done by moving SAM2 212 farther upstream from SAM1 206. In some cases, SAM2 is placed just before the final burst field (e.g., Burst2 214) in the servo data. Thus, for example, where two burst fields are employed, SAM2 212 is moved to a position in the servo data pattern preceding the second burst field. As another example, where four burst fields are employed, SAM 2 212 is moved to a position in the servo data pattern preceding the fourth burst field. This placement allows for maximizing the distance between SAM1 and SAM2 without further delaying processing of the final burst field (e.g., Burst2 214) prior to the start of user data 216. Based on the disclosure provided herein, one of ordinary skill in the art will appreciate other placements of SAM1 206 and SAM2 212 that may be used to maximize processing performance. For example, in some cases, SAM2 212 is moved after the last burst field (e.g., Burst 2 214) with an appropriate spacer after SAM2 212 to allow sufficient time for interpolation and processing of burst information from the final burst field before the start of user data 216.

Figure 5:
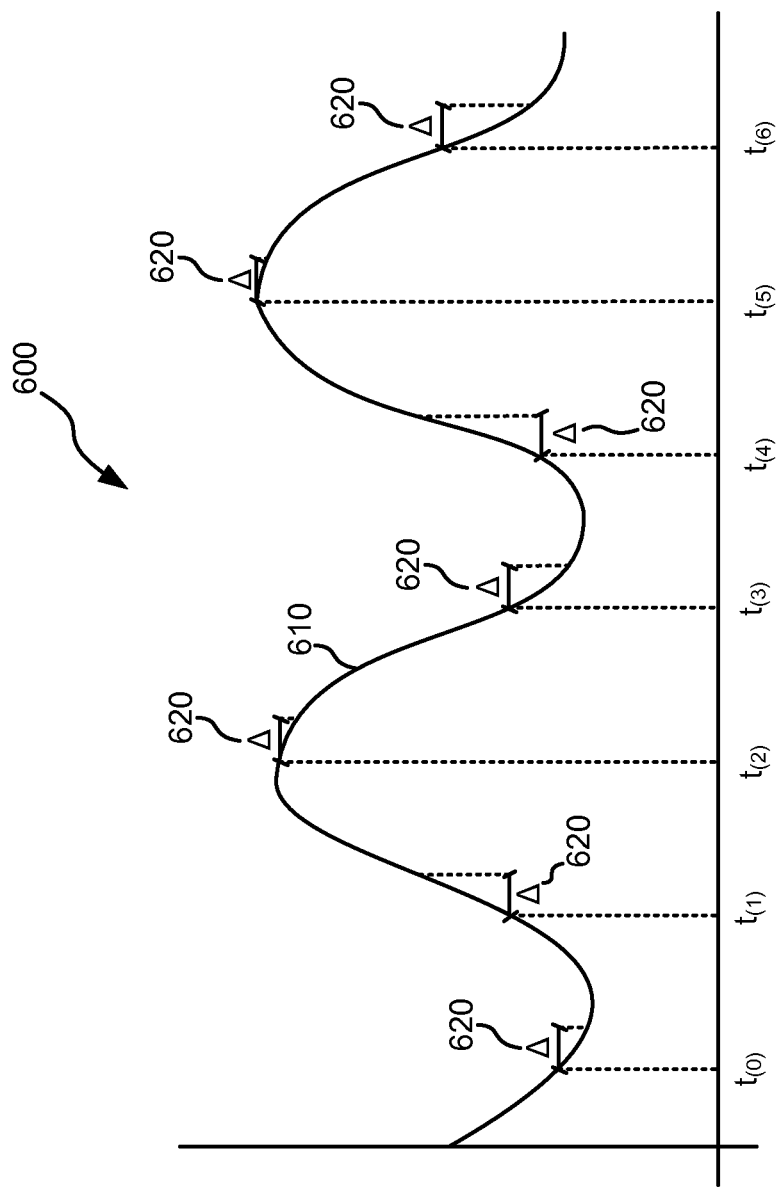
FIG. 5 is a timing diagram illustrating the process of interpolating burst information that may be used in accordance with some embodiments of the present invention.

The data corresponding to two or more burst fields included in the servo data pattern (e.g., Burst1 210 and Burst2 214) is then interpolated using an interpolator circuit 355. In particular, the burst information exists a known number of bit periods from SAM1 location 342. This distance offset from SAM1 location 342 is incremented by the calculated interpolation offset to yield error corrected samples corresponding to Burst1 210 and Burst2 214. FIG. 5 is a timing diagram 600 illustrating a process for interpolating burst information that may be used in accordance with some embodiments of the present invention. In timing diagram 600, a series of samples corresponding to time increments $t_{(0)}$, $t_{(1)}$, $t_{(2)}$, $t_{(3)}$, $t_{(4)}$, $t_{(5)}$, and $t_{(6)}$ are shown along an exemplary continuous output 610. The time increments are a defined distance from SAM1 location 342 that correspond to burst information. The interpolation process includes adjusting each of the samples forward by an interpolation offset 620 identified by the symbol Δ. Such a process results in a correction for any phase error remaining after the processing of the earlier processed preamble (e.g., preamble 204). It should be noted that the depicted interpolation process is exemplary and that other interpolation approaches may be used in accordance with different embodiments of the present invention.

Next, returning to FIG. 3, the corrected burst information is provided to a burst demodulator circuit 360 that performs burst demodulation. Such burst demodulation may be any burst demodulation known in the art. For example, where two burst fields are used in the servo data, a two burst demodulation process may be used. As another example, where four burst fields are used in the servo data, a four burst demodulation process may be used. Burst demodulator circuit 360 provides a position error signal 365 that may be used to properly place read/write head assembly 310 in relation to a storage medium (not shown) from which magnetic field 305 is derived.

Figure 6:
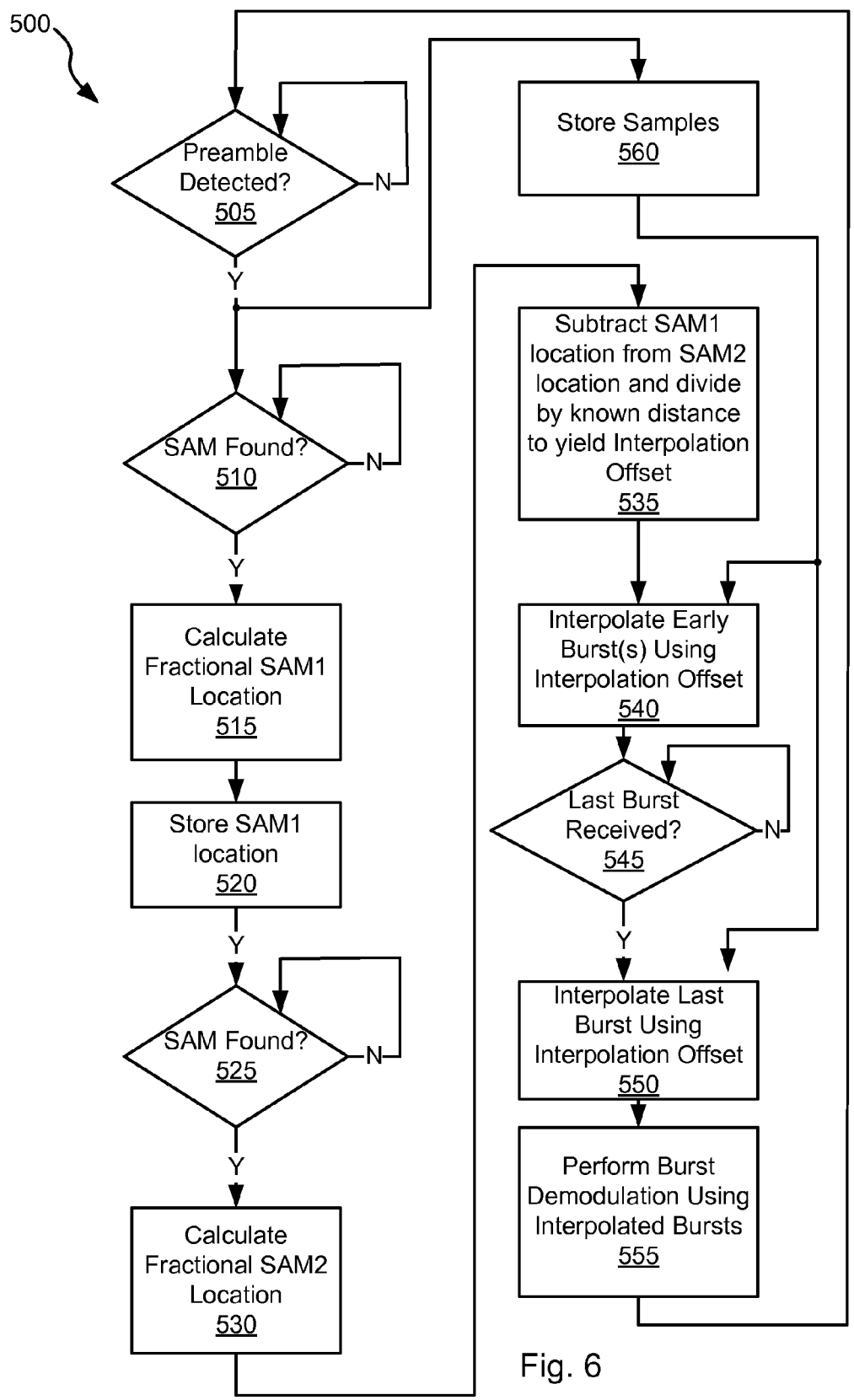
FIG. 6 is a flow diagram of a method in accordance with one or more embodiments of the present invention for processing an enhanced servo data pattern.

Turning to FIG. 6, a flow diagram 500 depicts a method in accordance with one or more embodiments of the present invention for processing an enhanced servo data pattern. Following flow diagram 500, a series of digital samples is received and continuously queried to determine if a predefined periodic preamble pattern is incorporated in the series of samples (block 505). Where a periodic preamble pattern is not detected (block 505), the process of comparing to detect the preamble pattern is continued. Otherwise, where a predefined periodic preamble is detected (block 505) a process of querying to determine if a SAM pattern is found (block 510). Preamble detection may be performed using any preamble detection process known in the art. Further, it should be noted that while the preamble pattern is being processed, timing and gain feedback is generated that is used to govern the sampling of the received information from which the series of samples is derived. Once a SAM is found (block 510), a fractional SAM1 location is calculated (block 515). Fractional SAM1 location may be calculated in accordance with the following equation:

$$\text{SAM Location} = t(x) + \frac{\text{sample}(x-1) + \text{sample}(x+1)}{2 * \text{sample}(x)},$$

Where sample(x) corresponds to the sample most likely corresponding to the actual location of the detected SAM, sample(x−1) and sample(x+1) correspond to the samples on either side of sample(x), and t(x) corresponds to the sample time of sample(x). The calculated fractional SAM1 location is then stored (block 520).

Once the first SAM is processed (blocks 510-520), the received series of samples is queried for a subsequent SAM (block 525). In some cases, the subsequent SAM has the same pattern as the first SAM. In other cases, the subsequent SAM has a pattern that is distinct from the first SAM. Where the subsequent SAM is found (block 525), a fractional SAM2 location is calculated (block 530). Fractional SAM2 location may be calculated using the same approach described above in relation to block 515. The fractional SAM1 location is then subtracted from the fractional SAM2 location, and the difference is divided by an expected or known distance between SAM1 and SAM2 (block 535) to yield an interpolation offset in accordance with the following equation:

$$\text{Interpolation Offset} = \frac{SAM\ 2\ \text{Location} - SAM\ 1\ \text{Location}}{\text{Known Distance}}.$$

The known distance is defined at the time servo data is written to the storage medium, and is the expected number of bit periods between SAM1 206 and SAM2 212 in the servo data pattern. As mentioned above, in some cases the known distance is increased as much as possible to increase the accuracy of the above mentioned equation. Increasing the known distance is done by moving SAM2 212 farther upstream from SAM1 206. In some cases, SAM2 is placed just before the final burst field (e.g., Burst2 214) in the servo data. Thus, for example, where two burst fields are employed, SAM2 212 is moved to a position in the servo data pattern preceding the second burst field. As another example, where four burst fields are employed, SAM 2 212 is moved to a position in the servo data pattern preceding the fourth burst field. This placement allows for maximizing the distance between SAM1 and SAM2 without further delaying processing of the final burst field (e.g., Burst2 214) prior to the start of user data 216. Based on the disclosure provided herein, one of ordinary skill in the art will appreciate other placements of SAM1 206 and SAM2 212 that may be used to maximize processing performance. For example, in some cases, SAM2 212 is moved after the last burst field (e.g., Burst 2 214) with an appropriate spacer after SAM2 212 to allow sufficient time for interpolation and processing of burst information from the final burst field before the start of user data 216.

Beginning sometime before the expected receipt of burst information, the received series of samples are stored (block 560). The stored samples are received from an analog to digital converter that is sampling an analog input signal using a sampling clock with a phase and frequency adjusted based on the earlier received preamble. A portion of the stored samples corresponding to one or more burst fields received prior to the second SAM are retrieved and interpolated using the previously calculated interpolation offset (block 540). This process results in burst information that is corrected for any phase offset remaining after synchronization using the preamble.

The received samples are further processed where it is determined if the last expected burst is received (block 545). Where the last expected burst is received (block 545), the series of samples corresponding to the last burst are interpolated as received using the same interpolation offset used to interpolate the earlier buffered burst information. This interpolation process results in a complete set of burst information that has been corrected to account for any phase offset remaining after synchronization using the preamble. At this point, the corrected burst information is provided to a burst demodulator circuit that performs burst demodulation using any demodulation approach known in the art.

In conclusion, the invention provides novel systems, devices, methods and arrangements for accessing a storage medium. While detailed descriptions of one or more embodiments of the invention have been given above, various alternatives, modifications, and equivalents will be apparent to those skilled in the art without varying from the spirit of the invention. For example, one or more embodiments of the present invention may be applied to various data storage systems and digital communication systems, such as, for example, tape recording systems, optical disk drives, wireless systems, and digital subscribe line systems. Therefore, the above description should not be taken as limiting the scope of the invention, which is defined by the appended claims.

What is claimed is:

1. A system for efficiently determining a position error of a head in relation to a storage medium, the system comprising:
   a detection circuit operable to:
      detect a first defined marker in a series of data and to establish a location of the first defined marker; and
      detect a second defined marker in the series of data a defined distance from the first defined marker, and to establish a location of the second defined marker; and
   an error calculation circuit operable to calculate an interpolation offset based at least in part on the location of the first defined marker and the location of the second defined marker.

2. The system of claim 1, wherein the detection circuit comprises:
   a first detector circuit operable to detect the first defined marker and to establish the location of the first defined marker; and
   a second detector circuit operable to detect the second defined marker in the series of data the defined distance from the first defined marker, and to establish the location of the second defined marker.

3. The system of claim 1, wherein the system further comprises:
   an interpolation circuit operable to interpolate a position location data in the series of data, and to provide an interpolated position location data.

4. The system of claim 3, wherein the system is implemented as part of a storage device, wherein the storage device includes:
   a storage medium including the series of data.

5. The system of claim 1, wherein the system further comprises:
   a burst demodulation circuit operable to generate a position error signal based at least in part on the interpolated position location data.

6. The system of claim 3, wherein the series of data is sector data including a preamble pattern, wherein the first defined marker is a first sector address mark, wherein the second defined marker is a second sector address mark, and wherein the system further includes a signal receiving circuit including:
   an analog to digital converter that samples an analog input using a sampling clock operating at a frequency and a phase to create the series of samples; and
   a preamble detector and clock recovery circuit operable to detect the preamble pattern within the sector data and to adjust at least one of the frequency and the phase based on the preamble pattern to create an adjusted sampling clock.

7. The system of claim 6, wherein the position location data includes at least a first burst pattern and a second burst pattern, wherein the first sector address mark is located after the preamble pattern and before the first burst pattern, and wherein the second sector address mark is located after the first burst pattern and before the second burst pattern.

8. The system of claim 7, wherein the sector data includes a Gray code, and wherein the Gray code is located after the first sector address mark and before the second sector address mark.

9. The system of claim 1, wherein the system is implemented as part of an integrated circuit.

10. The system of claim 3, wherein the location of the first defined marker includes a combination of fractional distance and an integer distance from a reference location.

11. A method for efficient determination of a position error, the method comprising:
   receiving the series of data, wherein the series of data includes a first defined marker, a second defined marker located a distance from the first defined marker, and a position location data;
   detecting the first defined marker;
   identifying a first location of the first defined marker;
   detecting the second defined marker;
   identifying a second location of the second defined marker;
   calculating an interpolation offset based at least in part on the first location and the second location;
   interpolating the position location data based on the interpolation offset to create interpolated position location data; and
   determining a position error using the interpolated position location data.

12. The method of claim 11, wherein the series of data is sector data including a preamble pattern, wherein the first defined marker is a first sector address mark, wherein the second defined marker is a second sector address mark, and wherein receiving the series of data includes:
   receiving an analog input including the sector data;
   sampling the analog input using a sampling clock operating at a frequency and a phase to generate at least a first portion of the sector data;
   detecting the preamble pattern within the sector data;
   adjusting at least one of the frequency and the phase based on the preamble pattern to create an adjusted sampling clock; and
   sampling the analog input using the adjusted sampling clock to generate at least a second portion of the sector data.

13. The method of claim 12, wherein the interpolation offset is operable to at least in part compensate for a phase error in the adjusted sampling clock.

14. The method of claim 12, wherein the first sector address mark is the same as the second sector address mark.

15. The method of claim 12, wherein the position location data includes at least a first burst pattern and a second burst pattern, wherein the first sector address mark is located after the preamble pattern and before the first burst pattern, and wherein the second sector address mark is located after the first burst pattern and before the second burst pattern.

16. The method of claim 15, wherein the sector data further includes a Gray code, and wherein the Gray code is located after the first sector address mark and before the second sector address mark.

17. The method of claim 12, wherein the position location data includes at least a first burst pattern, a second burst pattern and a third burst pattern, wherein the first sector address mark is located after the preamble pattern and before the first burst pattern, and wherein the second sector address mark is located after the second burst pattern and before the third burst pattern.

18. The method of claim 12, wherein the sector data is a first sector data, wherein the storage medium further includes a second sector data including the same preamble pattern, first sector address mark and second sector address mark.

19. The method of claim 12, wherein identifying the first location of the first sector address mark includes performing a first fractional location calculation, and wherein identifying the second location of the second sector address mark includes performing a second fractional location calculation.

20. The method of claim 12, wherein calculating the interpolation offset includes subtracting the first location from the second location and dividing the result by the distance.

* * * * *